United States Patent
Fraas et al.

[11] Patent Number: 5,878,042
[45] Date of Patent: Mar. 2, 1999

[54] METHOD FOR THE TRANSMISSION OF SIGNALS IN TIME DIVISION MULTIPLEX CHANNEL FORM VIA AN ATM TRANSMISSION DEVICE

[75] Inventors: Wolfgang Fraas, Wolfratshausen; Klaus Huenlich, Neuching, both of Germany

[73] Assignee: Siemens Aktiengesellschaft, Munich, Germany

[21] Appl. No.: 786,905

[22] Filed: Jan. 22, 1997

[30] Foreign Application Priority Data

Feb. 6, 1996 [DE] Germany ............. 196 04 245.3

[51] Int. Cl.[6] ................................................. H04J 3/02
[52] U.S. Cl. ................... 370/395; 370/465; 370/466; 370/442
[58] Field of Search ............... 370/465–68, 395, 370/522, 524, 433, 437, 442

[56] References Cited

U.S. PATENT DOCUMENTS

| | | | |
|---|---|---|---|
| 5,280,476 | 1/1994 | Kojima et al. ............. | 370/465 |
| 5,343,468 | 8/1994 | Rau ............................ | 370/465 |
| 5,455,841 | 10/1995 | Hazu ......................... | 375/240 |
| 5,479,407 | 12/1995 | Ko et al. .................... | 370/94.1 |
| 5,581,551 | 12/1996 | Fundneider et al. ...... | 370/395 |

FOREIGN PATENT DOCUMENTS

| | | |
|---|---|---|
| 0 580 012 A1 | 1/1994 | European Pat. Off. . |
| 0 581 087 A1 | 2/1994 | European Pat. Off. . |
| 42 07 027 A1 | 9/1992 | Germany . |
| 42 24 388 C1 | 7/1993 | Germany . |
| 42 25 389 C1 | 9/1993 | Germany . |
| 43 12 797 A1 | 10/1994 | Germany . |
| 43 43 720 C1 | 6/1995 | Germany . |
| 2 185 365 | 7/1987 | United Kingdom . |
| 2255259 | 10/1992 | United Kingdom ............ H04L 12/56 |
| 2 267 199 | 11/1993 | United Kingdom . |
| WO 95/32597 | 11/1995 | WIPO . |

Primary Examiner—Jeffery A. Hofsass
Assistant Examiner—Ashok Mannava
Attorney, Agent, or Firm—Hill & Simpson

[57] ABSTRACT

In a method for transmission of digital signals present in the form of time division multiplex channels via an ATM transmission device, a plurality of time division multiplex channels are cyclically combined in a call frame with cyclically transmitted frame cycles. The call frame contains at least one useful information channel and at least one control information channel. The digital signals present in the form of time division multiplex channels are converted into ATM cell useful information. These ATM cells are transmitted in virtual ATM channels and then again converted into time division multiplex channels which are combined in a call frame with frame cycles to be transmitted cyclically. If empty useful information channels are to be transmitted, an information item regarding empty useful information channels is inserted into the control information channel data and the useful information channels are not transmitted via ATM. At the receiving point, the information item regarding empty useful information channels is detected and empty useful information channels are inserted.

5 Claims, 4 Drawing Sheets

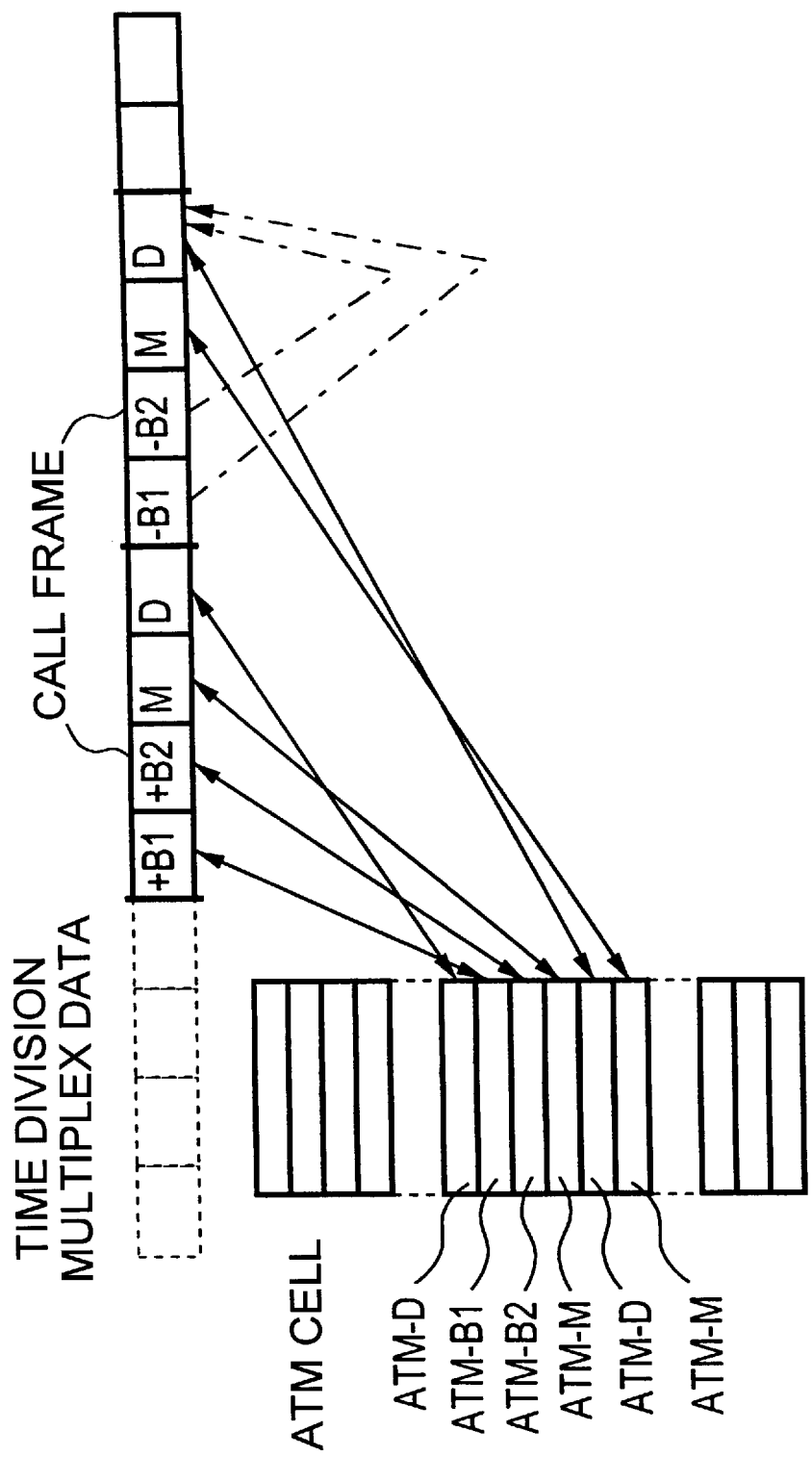

METHOD FOR THE TRANSMISSION OF SIGNALS IN TIME DIVISION MULTIPLEX CHANNEL FORM VIA AN ATM TRANSMISSION DEVICE

BACKGROUND OF THE INVENTION

The present invention relates to a method for the transmission of digital signals present in the form of time division multiplex channels via an ATM transmission device, the digital signals present in the form of time division multiplex channels being converted into ATM cells. These ATM cells are transmitted in virtual ATM channels and then converted into time division multiplex channels, when data transmitted in a time division multiplex channel is divided into at least one useful information channel and at least one control information channel.

SUMMARY OF THE INVENTION

It is an object of the present invention to provide an improved method for transmission of digital signals in time division multiplex channel form via an ATM transmission device.

In general terms the present invention is a method for transmission of digital signals present in the form of time division multiplex channels via an ATM transmission device. A plurality of time division multiplex channels are cyclically combined in a call frame with cyclically transmitted frame cycles. The call frame contains at least one useful information channel and at least one control information channel. The digital signals present in the form of time division multiplex channels are converted into ATM cell useful information. These ATM cells are transmitted in virtual ATM channels and are then again converted into time division multiplex channels which are combined in a call frame with frame cycles to be transmitted cyclically. It is determined if at least one useful information channel of a frame cycle contains no useful information and, as required, entry of an information item regarding this useful information channel content in the control information channel of the same frame cycle. The digital signals of the time division multiplex channels of the frame cycle are converted into ATM cell useful information and the information items of the time division multiplex channels are inverted into an ATM cell assigned to the call frame. The sequence of the information items of time division multiplex channels combined in the frame cycle is defined such that the information items of the control information channel are inserted in the ATM cell before the remaining information items of this frame cycle. The digital signals of a useful information channel which does not contain any useful information are discarded and are not inserted into the ATM cell. The ATM cell is transmitted to a receiver. The ATM cell is read out word-by-word in the receiver, with evaluation of the entered information item regarding the useful information channel content of each frame cycle. The information contained in the ATM cell is converted into digital signals of time division multiplex channels and these time division multiplex channels are inserted, ordered by frame cycles, into the associated call frame. A useful information channel without any useful information is inserted into a frame cycle if, during the evaluation of the entered information item regarding the useful information channel content of this frame cycle, a useful information channel without any useful information is determined.

In an advantageous development of the present invention the information items of the time division multiplex channels of a call frame cycle are inserted into the next ATM cell when the as yet not completely filled useful information area of an ATM cell is not sufficient to accommodate all the information items of the call frame cycle which are to be entered into the ATM cell.

The data to be transmitted is contained as useful information in time division multiplex channels. A plurality of time division multiplex channels are cyclically combined in a call frame with cyclically transmitted frame cycles and the call frame containing at least one useful information channel and at least one control information channel.

To transmit such data via an ATM transmission device, it is determined according to the invention whether or not at least one useful information channel of a frame cycle contains a useful information item. If this is the case, a corresponding information item regarding this useful information channel content is entered in the control information channel of the same frame cycle. The digital signals of the time division multiplex channels of the frame cycle are converted into ATM cell useful information and inserted into an ATM cell assigned to the call frame. The sequence of the information items of time division multiplex channels combined in the frame cycle is defined such that the information items of the control information channel are inserted in the ATM cell before the remaining information items of a frame cycle. In this case, the digital signals of a useful information channel which does not contain any useful information are discarded and not inserted into the ATM cell.

According to the present invention, the A774 cell is transmitted to a receiver and is read out word by word in the receiver, the information item, entered in the control information, regarding the useful information channel content of each frame cycle being evaluated. The information items contained in the ATM cell are converted into digital signals of time division multiplex channels and these time division multiplex channels are inserted, ordered by frame cycles, in their previous sequence into the associated call frame. A useful information channel without any useful information is inserted into a frame cycle if, during the evaluation of the entered information item regarding the useful information channel content of this frame cycle, the information regarding a useful information channel without any useful information is determined.

By virtue of these measures, the number of frame cycles whose information can be transmitted within an ATM cell depends on the presence of useful information in the useful information channels of the call frame. Consequently, the transmission capacity of the ATM transmission system is increased in the event of empty useful information channels. Although an ATM cell is filled within a longer period of time in the absence of useful information due to the time response of the time division multiplex transmission, in the absence of useful information such a time delay is negligible.

In order to simplify a device for converting digital signals, transmitted as ATM cells, of time division multiplex channels into time division multiplex channels, it is advisable to transmit the information of an entire frame cycle within the same ATM cell. If a plurality of frame cycle contents can be written to the useful area of an ATM cell, this ensures that a received ATM cell always contains complete frame cycles. If the content of a frame cycle cannot be written to the useful data area of a single ATM cell, it is ensured that there is always present at the start of an ATM cell a control information content including the information regarding empty useful information channels to be added to the associated call frame cycle.

This is achieved by virtue of the fact that the information items of the time division multiplex channels of a call frame cycle are inserted into the next ATM cell when the as yet not completely filled useful information area of an ATM cell is not sufficient to accommodate all the information items of the call frame cycle which are to be entered into the ATM cell.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a diagrammatic illustration of a time division multiplex data stream, two useful information channels B1 and B2, one monitor channel and one signaling information channel D being illustrated within each call frame, which represents a telephone call. (Corresponding call frames are used, for example, in the industry standard IOMO-2).

DESCRIPTION OF THE PREFERRED EMBODIMENTS

FIG. 1 illustrates two call frame cycles, useful information being present in the B channels in a first call frame cycle, identified by a plus sign in each case, and empty useful information channels B1 and B2 being illustrated in the second call frame cycle, identified by a minus sign. In the example, the time division multiplex channels B1, B2, M and D illustrated correspond to a data word (octet) in each case. In the case of the frame cycle illustrated on the left, the contents of the D channel, the B1 channel, the B2 channel and the M channel are entered in a specified sequence into the ATM cell. As is illustrated by arrows at both ends of the corresponding connection lines, the conversion from the ATM cell data into time division multiplex data is correspondingly effected the other way round. It is essential that the control information of the D channel for the corresponding frame cycle is at the beginning in the ATM cell.

The frame cycle, illustrated on the right, of time division multiplex data having empty useful information channels B1 and B2 is not completely converted into the ATM cell. As illustrated by dot-dashed lines, the information regarding an empty B1 channel and the information regarding an empty B2 channel are introduced into the data content of the D channel and the D channel data and the M channel data are then entered into the ATM cell. Consequently, in the exemplary embodiment shown, it is possible to double the transmission capacity of the ATM cell for frame cycles having empty useful channels.

Frame cycles of the same call frame are illustrated directly succeeding one another in FIG. 1. This is not essential for the present invention. It is equally possible for the individual frame cycles to succeed one another at fixed time intervals as subframes of a superordinate time division multiplex frame.

Figure 2A:
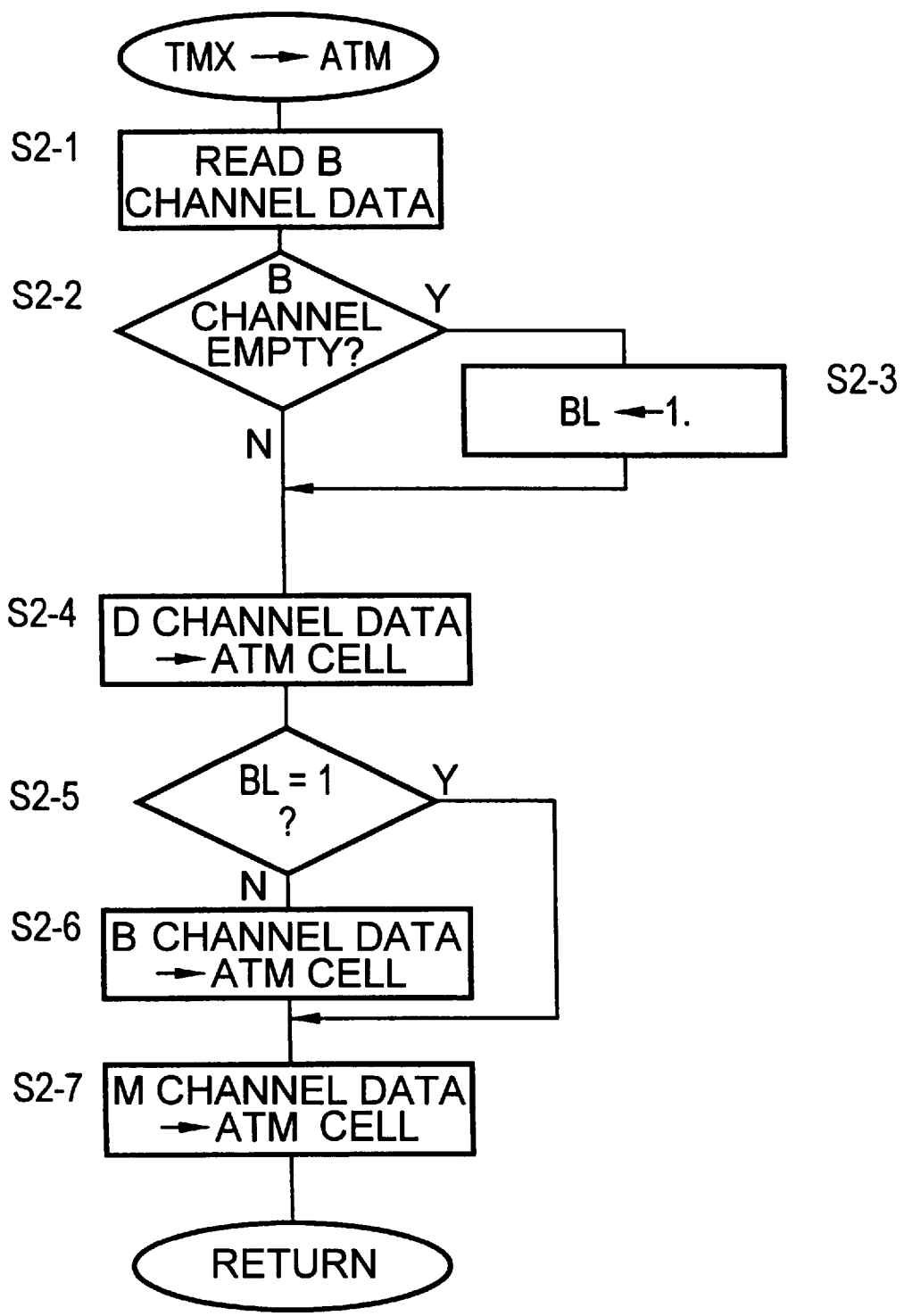
FIGS. 2a, 2b and 3 show flow diagrams of exemplary embodiments of the method according to the present invention.

FIG. 2a shows a flow diagram for the conversion of time division multiplex channel information into ATM cell information, for the case where either only one B channel is present or there is only a distinction made between "all B channels are empty" and "not all B channels are empty". First, the B channel data is read in step S2-1. Then, in step S2-2, it is established whether the B channels are empty. If B channels are empty, in step S2-3 a marker (called flag below) BL for empty B channels is set to 1 within the D channel information. The control then moves to step S2-4. If no B channels are empty during the check of step S2-2, the control moves directly to step S24 in order to convert the D channel data into ATM cell data and enter it into the ATM cell. A check is then made in step S2-5 to determine if the flag BL has been set to 1. if the flag BL has not been set to 1, in step S2-6 the B channel data is converted into ATM cell data and written to the ATM cell. If, during the check of step S2-5, the flag BL has been set to 1, the control moves to step S2-7 in order to convert the M channel data into ATM cell data and enter it into the ATM cell. The control then returns to its starting point. From step S2-6, in which the B channel data has been converted into ATM cell data and written in, the control moves directly to step S2-7.

Figure 2B:
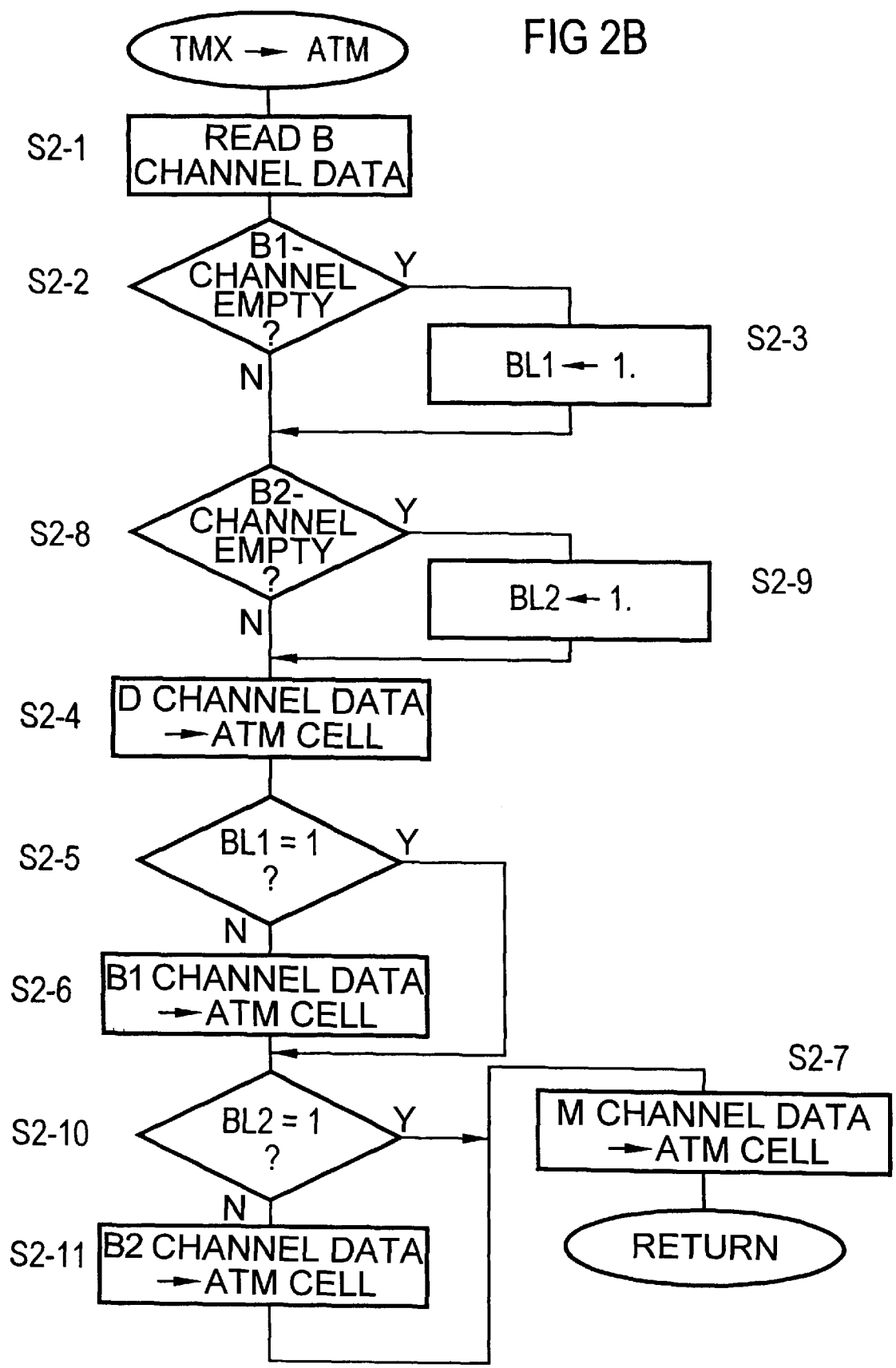

The sequence of events in FIG. 2b differs from the sequence of events in FIG. 2a by virtue of the fact that a separate investigation is carried out for two B channels B1 and B2 within a frame cycle to determine if they are empty. For this purpose, a check is made in step S2-2 to determine if the B1 channel is empty and in step S2-3 to determine if a corresponding flag BL1 for the identification of the content of the B1 channel is set. After the step S2-3 or if in step S2-2 the B1 channel has been identified as not being empty, a check is made in a step S2-8 to determine if the B2 channel is empty. If the B2 channel is empty, then in step S2-9 a flag BL2 for the identification of the content of the B2 channel is set to 1 in the D channel information. The control then moves from step S2-9 to the step S2-4 described above. If the B2 channel is not empty, the control moves directly from step S2-8 to step S2-4 in order to convert the D channel data into ATM cell data and enter it into the ATM cell. In step S2-5, a check is to determine if the flag BL1 has been set to 1. If the flag BL1 has not been set to 1, then the B1 channel data is converted into ATM cell data and entered into the ATM cell. Then, or if BL1=1 is true during the check of step S2-5, the control moves to step S2-10 in order to determine if the flag BL2 has been set to 1. If the flag BL2 has not been set to 1, the B2 channel data is converted into ATM cell data and entered into the ATM cell in step S2-11. Subsequently, or if in step S2-10 the flag BL2 has been identified as having been set to 1, the control moves to step S2-7 in order, in the aforementioned manner, to convert the M channel data into ATM cell data and write it to the ATM cell. The control thereupon returns to its starting point.

The method sequences of FIGS. 2a and 2b relate to time division multiplex data frames having B channels, a monitor channel and a D channel. However, the present invention is not restricted to entering the information regarding empty useful information channels by setting a flag. A person skilled in the art knows various other possibilities in this respect.

Figure 3:
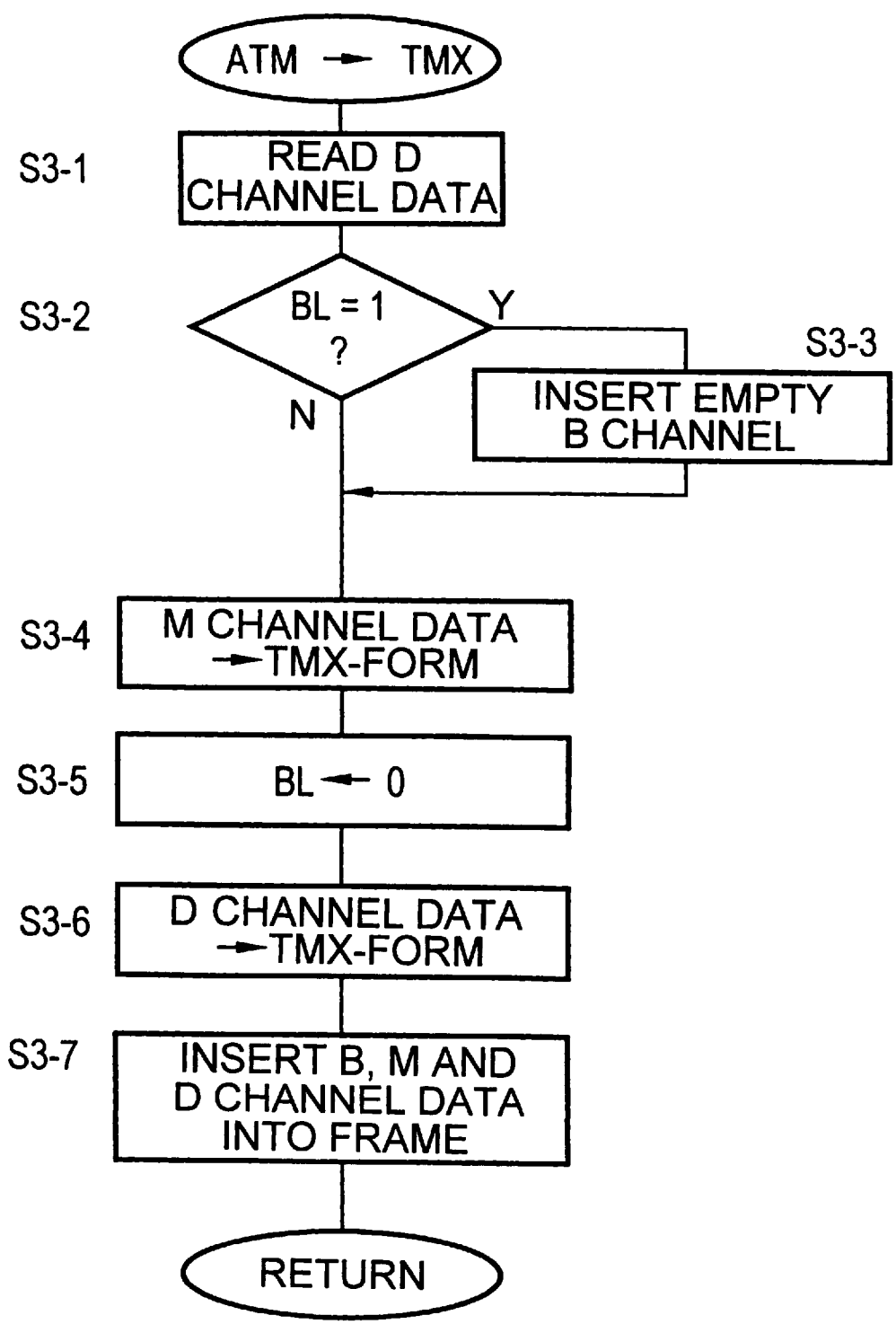

FIG. 3 shows a control sequence for converting time division multiplex data, which has entered into ATM cells, back into time division multiplex data. FIG. 3 is in this case based on the assumption that the ATM cell has been filled by a method according to FIG. 2a.

In step S3-1 of FIG. 3, the D channel data of a frame cycle is read. Subsequently, it is established in step S3-2 whether or not the flag BL has been set to 1. If the flag BL has been set to 1, in step S3-3 a data record for an empty B channel (or for a plurality of empty B channels) is entered into the corresponding time division multiplex frame cycle. The control then moves to step S3-4. If the flag BL has been identified as not having been set to 1 in step S3-2, the control moves directly to step S3-4 in order to convert the M channel data of the call frame cycle, which is present in ATM cell form, into time division multiplex form.

The control then moves to step S3-5 in order to put the D channel information back into its original state by resetting the flags BL to their original state. The control then moves to step S3-6 in order to convert the D channel information into time division multiplex data. Subsequently, in step S3-7, the B channel data, the monitor channel data and the D channel data are inserted in their original sequence into the time division multiplex frame and the control moves back to its starting point.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmission of digital signals present in a form of time division multiplex channels via an ATM transmission device, a plurality of time division multiplex channels being cyclically combined in a call frame with cyclically transmitted frame cycles and the call frame containing at least one useful information channel and at least one control information channel, and the digital signals being converted into ATM cell useful information, such ATM cells being transmitted in virtual ATM channels and being again converted into time division multiplex channels which are combined in a call frame with frame cycles to be transmitted cyclically, comprising the steps of:

determining if at least one useful information channel of a frame cycle contains no useful information and, entering an information item regarding this useful information channel content in the control information channel of the same frame cycle;

converting of the digital signals of the time division multiplex channels of the frame cycle into ATM cell useful information and inserting information items of the time division multiplex channels into an ATM cell assigned to the call frame, a sequence of information items of time division multiplex channels combined in the frame cycle being defined such that information items of the control information channel are inserted in the ATM cell before remaining information items of said frame cycle;

discarding digital signals of a useful information channel which does not contain any useful information, such digital signals not being inserted into the ATM cell;

transmitting of the ATM cell to a receiver;

reading out word-by-word the ATM cell in the receiver, with evaluation of the entered information item regarding the useful information channel content of each frame cycle;

converting the information contained in the ATM cell into digital signals of time division multiplex channels and inserting of these time division multiplex channels, ordered by frame cycles, into an associated call frame, a useful information channel without any useful information being inserted into a frame cycle if, during evaluation of the entered information item regarding the useful information channel content of this frame cycle, a useful information channel without any useful information is identified.

2. The method according to claim 1, wherein the information items of the time division multiplex channels of a call frame cycle are inserted into the next ATM cell when the as yet not completely filled useful information area of an ATM cell is not sufficient to accommodate all the information items of the call frame cycle which are to be entered into the ATM cell.

3. A method for transmission of digital signals present in a form of time division multiplex channels via an ATM transmission device, a plurality of time division multiplex channels being cyclically combined in a call frame with cyclically transmitted frame cycles and the call frame containing at least one useful information channel and at least one control information channel, and the digital signals being converted into ATM cell useful information, such ATM cells being transmitted in virtual ATM channels and being again converted into time division multiplex channels which are combined in a call frame with frame cycles to be transmitted cyclically, comprising the steps of:

determining if at least one useful information channel of a frame cycle contains no useful information and, entering an information item regarding this useful information channel content in the control information channel of the same frame cycle;

converting of the digital signals of the time division multiplex channels of the frame cycle into ATM cell useful information and inserting information items of the time division multiplex channels into an ATM cell assigned to the call frame, a sequence of information items of time division multiplex channels combined in the frame cycle being defined such that information items of the control information channel are inserted in the ATM cell before remaining information items of said frame cycle;

discarding digital signals of a useful information channel which does not contain any useful information, such digital signals not being inserted into the ATM cell;

transmitting of the ATM cell to a receiver;

a reading out word-by-word the ATM cell in the receiver, with evaluation of the entered information item regarding the useful information channel content of each frame cycle;

converting the information contained in the ATM cell into digital signals of time division multiplex channels and inserting of these time division multiplex channels, ordered by frame cycles, into an associated call frame, a useful information channel without any useful information being inserted into a frame cycle if, during evaluation of the entered information item regarding the useful information channel content of this frame cycle, a useful information channel without any useful information is identified;

inserting information items of the time division multiplex channels of a call frame cycle into a next ATM cell when an as yet not completely filled useful information area of an ATM cell is not sufficient to accommodate all information items of the call frame cycle which are to be entered into the ATM cell.

4. A method for transmission of digital signals present in a form of time division multiplex channels via an ATM transmission device, comprising the steps of:

cyclically combining a plurality of time division multiplex channels in a call frame with cyclically transmitted frame cycles and the call frame containing at least one useful information channel and at least one control information channel;

converting digital signals into ATM cell useful information;

transmitting said ATM cells in virtual ATM channels and converting the ATM cells into time division multiplex channels which are combined in a call frame with frame cycles to be transmitted cyclically;

determining if at least one useful information channel of a frame cycle contains no useful information and, entering an information item regarding this useful information channel content in the control information channel of the same frame cycle;

converting of the digital signals of the time division multiplex channels of the frame cycle into ATM cell useful information and inserting information items of the time division multiplex channels into an ATM cell assigned to the call frame, a sequence of information items of time division multiplex channels combined in the frame cycle being defined such that information items of the control information channel are inserted in the ATM cell before remaining information items of said frame cycle;

discarding digital signals of a useful information channel which does not contain any useful information, such digital signals not being inserted into the ATM cell;

transmitting of the ATM cell to a receiver;

reading out word-by-word the ATM cell in the receiver, with evaluation of the entered information item regarding the useful information channel content of each frame cycle;

converting the information contained in the ATM cell into digital signals of time division multiplex channels and inserting of these time division multiplex channels, ordered by frame cycles, into an associated call frame, a useful information channel without any useful information being inserted into a frame cycle if, during evaluation of the entered information item regarding the useful information channel content of this frame cycle, a useful information channel without any useful information is identified.

5. The method according to claim 4, wherein the information items of the time division multiplex channels of a call frame cycle are inserted into the next ATM cell when the as yet not completely filled useful information area of an ATM cell is not sufficient to accommodate all the information items of the call frame cycle which are to be entered into the ATM cell.

\* \* \* \* \*